US011263981B2

(12) United States Patent
Tomokawa

(10) Patent No.: US 11,263,981 B2
(45) Date of Patent: Mar. 1, 2022

(54) DISPLAY DEVICE AND HEAD-MOUNTED DISPLAY

(71) Applicant: SHARP KABUSHIKI KAISHA, Sakai (JP)

(72) Inventor: Shinji Tomokawa, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 51 days.

(21) Appl. No.: 16/883,294

(22) Filed: May 26, 2020

(65) Prior Publication Data

US 2020/0380922 A1 Dec. 3, 2020

Related U.S. Application Data

(60) Provisional application No. 62/855,140, filed on May 31, 2019.

(51) Int. Cl.
*G09G 3/36* (2006.01)
*G09G 3/34* (2006.01)
*F21V 8/00* (2006.01)

(52) U.S. Cl.
CPC .......... *G09G 3/3406* (2013.01); *G02B 6/0051* (2013.01); *G02B 6/0068* (2013.01); *G02B 6/0083* (2013.01); *G09G 2320/0233* (2013.01); *G09G 2320/0626* (2013.01)

(58) Field of Classification Search
USPC .................. 345/102, 7, 8; 348/62; 358/461; 353/38; 359/233
See application file for complete search history.

(56) References Cited

U.S. PATENT DOCUMENTS

| 2005/0206966 | A1* | 9/2005 | Kakumitsu | .......... H04N 5/3572 358/461 |
| 2008/0043312 | A1* | 2/2008 | Yamada | ............... G03B 21/208 359/233 |
| 2008/0180643 | A1* | 7/2008 | Endo | ...................... G03B 21/10 353/38 |
| 2012/0203086 | A1* | 8/2012 | Rorabaugh | .......... A61B 3/1173 600/321 |
| 2015/0277123 | A1* | 10/2015 | Chaum | .............. G02B 27/0075 348/62 |

(Continued)

FOREIGN PATENT DOCUMENTS

WO 2018/181908 A1 10/2018

*Primary Examiner* — Thuy N Pardo
(74) *Attorney, Agent, or Firm* — ScienBiziP, P.C.

(57) ABSTRACT

A display device includes: a display panel including a display region for image display; an illumination device including a plurality of light sources, the illumination device being configured to cast light upon the display panel; and a control substrate including a regulator configured to regulate an amount of light emitted from the plurality of light sources, wherein the display region is sectioned into a plurality of sections in a form of concentric circles, and the regulator regulates the amount of light in such a manner that one of the plurality of sections that is adjacent to a middle of the concentric circles is irradiated with a relatively large amount of light, and in such a manner that another one of the plurality of sections that is adjacent to an outer edge of the concentric circles is irradiated with a relatively small amount of light.

14 Claims, 11 Drawing Sheets

(56) References Cited

U.S. PATENT DOCUMENTS

| | | |
|---|---|---|
| 2016/0113106 A1* | 4/2016 | Kim ..................... H05K 1/181 |
| | | 361/749 |
| 2017/0090018 A1* | 3/2017 | Buettgen ............... G01S 7/4813 |
| 2018/0196185 A1* | 7/2018 | Shi ....................... G02B 6/0078 |
| 2018/0204532 A1* | 7/2018 | Kobayashi ........... G09G 3/3233 |
| 2018/0210134 A1* | 7/2018 | Richards .............. G02B 5/0231 |
| 2019/0189936 A1* | 6/2019 | Watabe ................ H01L 51/5028 |
| 2019/0220002 A1* | 7/2019 | Huang ..................... G06T 7/70 |
| 2019/0235236 A1* | 8/2019 | Ollila ................. G02B 27/0093 |
| 2019/0247650 A1* | 8/2019 | Tran ...................... A61N 1/025 |
| 2019/0353894 A1* | 11/2019 | Zhou ................... H04N 13/383 |
| 2020/0008299 A1* | 1/2020 | Tran ....................... H05K 1/189 |
| 2020/0089000 A1* | 3/2020 | Hayashi ............. C09K 11/7734 |
| 2021/0065640 A1* | 3/2021 | Kobayashi .......... H01L 27/1225 |
| 2021/0271144 A1* | 9/2021 | Kimura ................ G02F 1/1337 |

* cited by examiner

FIG.1
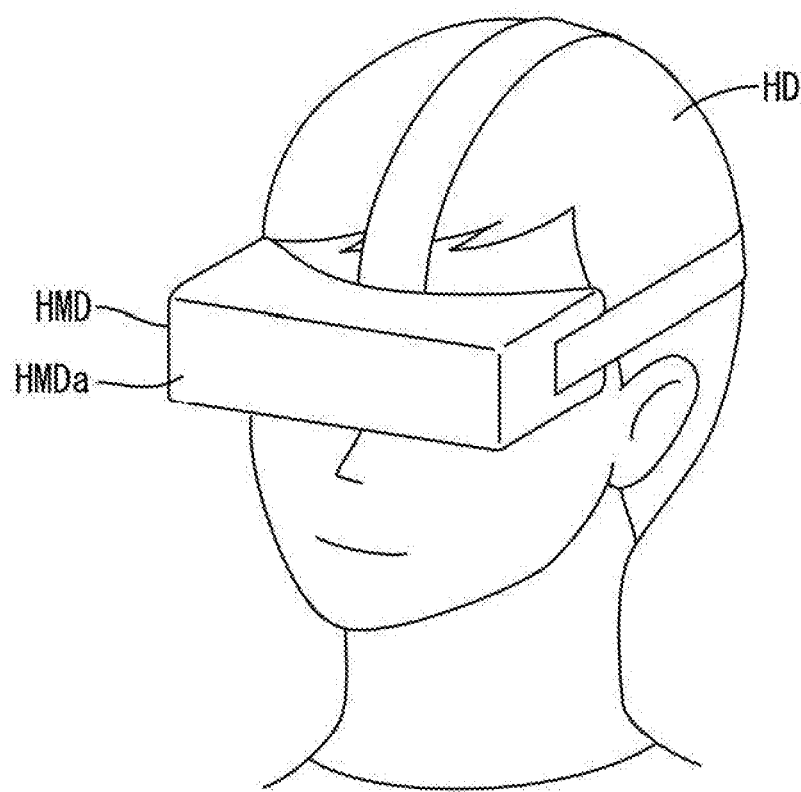
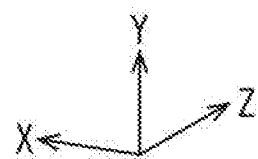

DISPLAY DEVICE AND HEAD-MOUNTED DISPLAY

CROSS-REFERENCE TO RELATED APPLICATION

The present application claims priority from Provisional Application No. 62/855,140, the content to which is hereby incorporated by reference into this application.

BACKGROUND OF THE INVENTION

1. Field of the Invention

The present invention relates to a display device and a head-mounted display.

2. Description of the Related Art

A conventionally known liquid-crystal display is used in a head-mounted display (HMD) that is mounted to cover the eyes of a user. A known example of such a liquid-crystal display is described in International Publication No. 2018/181908. The head-mounted display in International Publication No. 2018/181908 includes a liquid-crystal display and a lens that forms an image displayed on the liquid-crystal display onto the user's eyes. Regulating the focal distance of the lens allows the user to see an enlarged image (or virtual image) that appears on a virtual display whose screen size is much larger than the screen size of the liquid-crystal display.

SUMMARY OF INVENTION

In an HMD, since a liquid-crystal display and user's eyes are close to each other, and the user virtually recognizes an enlarged image, the liquid-crystal display for the HDM is required to have high definition (or high resolution). On the other hand, when the liquid-crystal display is enhanced to have high resolution, a lightproof portion, which divides each pixel, takes up a large area within the plane of a liquid-crystal panel. The liquid-crystal panel hence has degraded light transmittance. As a result, the liquid-crystal display has low brightness, and thus causing degradation in display quality. In fact, enhancing the amount of light emitted from LEDs (which are an example of a light source) to avoid brightness reduction increases LED power consumption.

SUMMARY OF INVENTION

Based on these circumstances, it is an object of an aspect of the present invention to prevent degradation in display quality and reduce power consumption.

(1) A display device according to a preferred embodiment of the present invention includes a display panel having a display region for image display. The display device also includes an illumination device that has a plurality of light sources and casts light upon the display panel. The display device also includes a control substrate that includes a regulator that regulates the amount of light emitted from the light sources. The display region is sectioned into a plurality of sections in the form of concentric circles. The regulator regulates the amount of light in such a manner that one of the sections that is adjacent to the middle of the concentric circles is irradiated with a relatively large amount of light, and in such a manner that another one of the sections that is adjacent to the outer edge of the concentric circles is irradiated with a relatively small amount of light.

(2) In another preferred embodiment of the present invention, the display device is configured, in addition to Preferred Embodiment (1), such that the regulator decreases the amount of light stepwise from the section adjacent to the middle of the concentric circles toward the section adjacent to the outer edge of the concentric circles.

(3) In still another preferred embodiment of the present invention, the display device is configured, in addition to Preferred Embodiment (1) or (2), such that the light sources are separated into groups in such a manner that the groups correspond to the respective sections, and is configured such that the regulator regulates the amount of light for each of the groups.

(4) In yet another preferred embodiment of the present invention, the display device is configured, in addition to Preferred Embodiment (3), such that the light sources are LEDs, and that the LEDs are connected in series for each of the groups.

(5) In further another preferred embodiment of the present invention, the display device is configured, in addition to any of Preferred Embodiments (1) to (4), such that the regulator regulates the amount of light by controlling a light-source driving unit that supplies a current to the light sources to drive the light sources.

(6) In still yet another preferred embodiment of the present invention, the display device is configured, in addition to any of Preferred Embodiments (1) to (5), such that the concentric circles have a center that coincides with the center of the display region. The concentric circles serve as boundaries of the sections.

(7) In still further another preferred embodiment of the present invention, the display device is configured, in addition to Preferred Embodiment (6), such that each of the sections is provided with a reference of allowance with regard to the number of defects and the number of foreign substances.

(8) In still yet further another preferred embodiment of the present invention, the display device is configured, in addition to any of Preferred Embodiments (1) to (5), such that the control substrate includes a calculator that calculates the amount of light for each of the sections in accordance with information about a viewpoint. The information is supplied from a detector disposed outside. The display device is configured such that the regulator regulates the amount of light in accordance with a result calculated by the calculator.

(9) In another preferred embodiment of the present invention, the display device is configured, in addition to Preferred Embodiment (8), such that the concentric circles have a center that coincides with the viewpoint. The concentric circles serve as boundaries of the sections.

(10) In still another preferred embodiment of the present invention, the display device is configured, in addition to Preferred Embodiment (8) or (9), such that the regulator regulates the amount of light by controlling a light-source driving unit that supplies a current to the light sources to drive the light sources, and is configured such that the calculator calculates a value of the current, supplied from the light-source driving unit to the light sources.

(11) In further another preferred embodiment of the present invention, the display device is configured, in addition to any of Preferred Embodiments (1) to (10), such that the illumination device includes a light guide plate that guides the light emitted from the light sources, and is configured such that the light sources are arranged in parallel in a predetermined direction so as to face a light-entrance surface of the light guide plate.

(12) In yet another preferred embodiment of the present invention, the display device is configured, in addition to any of Preferred Embodiments (1) to (10), such that the illumination device includes a diffusion plate that diffuses the light emitted from the light sources, and is configured such that the light sources are arranged in parallel in a planar manner so as to face one of a pair of surfaces of the diffusion plate. The surface is remote from the display panel.

(13) A head-mounted instrument according to a preferred embodiment of the present invention includes a head-mounted instrument to be mounted onto the head of a user. The head-mounted instrument includes the display device according to any of Preferred Embodiments (1) to (7) and Preferred Embodiment (11), and includes a lens that forms an image displayed on the display device onto the eyes of the user.

(14) A head-mounted instrument according to a preferred embodiment of the present invention includes a head-mounted instrument to be mounted onto the head of a user. The head-mounted instrument includes the display device according to any of Preferred Embodiments (8) to (10), and a lens that forms an image displayed on the display device onto the eyes of the user.

In another preferred embodiment of the present invention, the head-mounted display is configured such that the detector is a camera.

An aspect of the present invention can prevent degradation in display quality and reduce power consumption.

BRIEF DESCRIPTION OF DRAWINGS

FIG. 1 is a perspective view of the head of a user wearing a head-mounted display according to a first preferred embodiment of the present invention;

DETAILED DESCRIPTION OF THE INVENTION

First Preferred Embodiment

A first preferred embodiment of the present invention will be described with reference to FIGS. 1 to 6. This preferred embodiment describes, by way of example only, a head-mounted display HMD in the form of goggles, and a liquid-crystal display 10 (which is an example of a display device) that is used for the head-mounted display HMD. There are an X-axis, Y-axis, and Z-axis shown in parts of FIGS. 1, 2, 3, 4, 8, 10, and 11. The direction of each axis is common throughout the drawings. Further, a side adjacent to a liquid-crystal panel 20 in the Z-axis direction is the front of the liquid-crystal display 10, and a side adjacent to a backlight 30 in the Z-axis direction is the back of the same.

Figure 2:
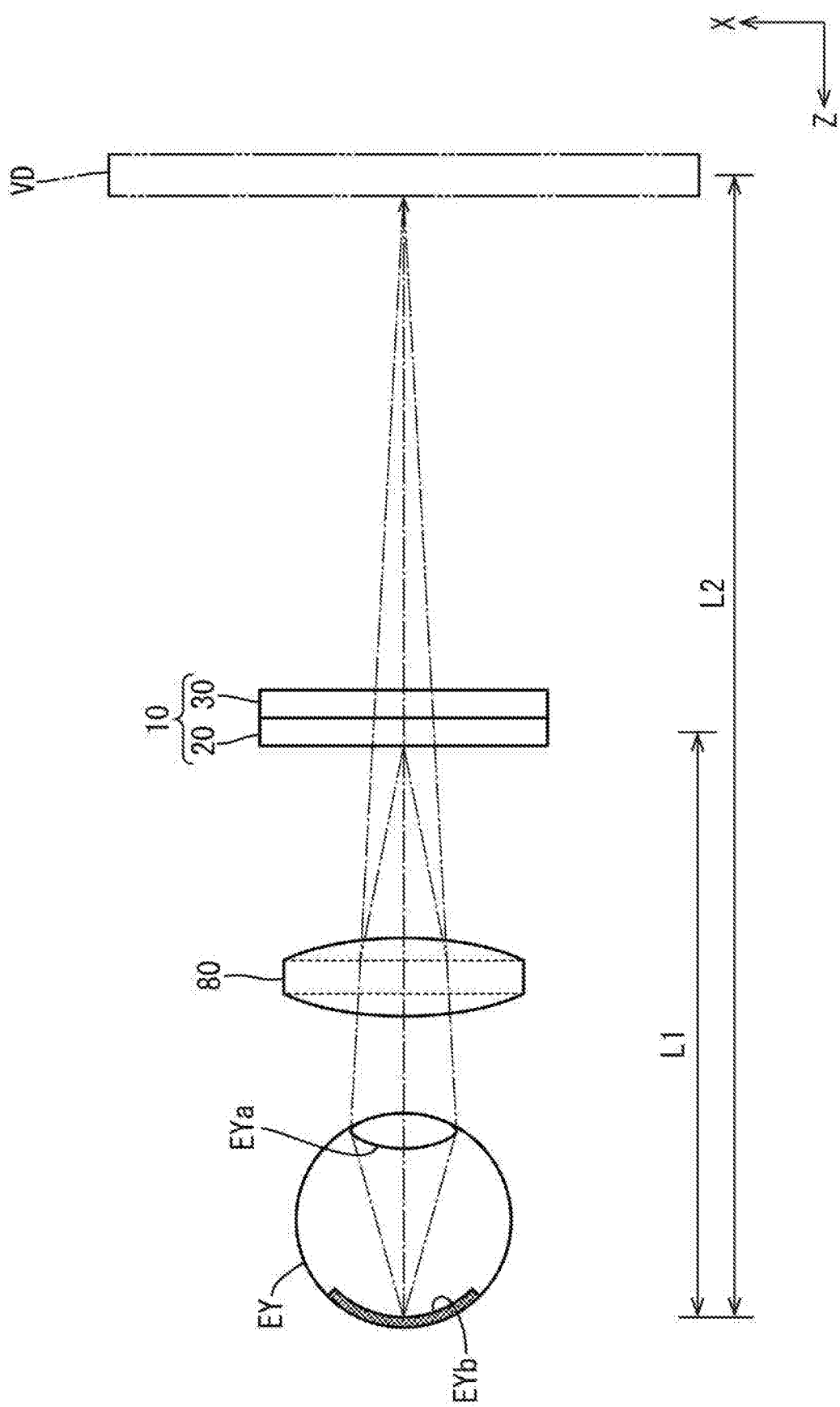
FIG. 2 is a side view of the optical relationship between a liquid-crystal display, lens, and user's eyeball.

As illustrated in FIG. 1, the head-mounted display HMD includes a head-mounted instrument HMDa that is to be mounted onto a head HD of a user to cover user's both eyes. As illustrated in FIG. 2, the head-mounted instrument HMDa has inside at least the liquid crystal display 10 that displays an image, and a lens 80 that forms the image displayed on the liquid crystal display 10 onto an eyeball (i.e., eye) EY of the user. A single liquid-crystal display 10 can be installed in the head-mounted instrument HMDa and can display right-eye and left-eye images. Alternatively, two liquid-crystal displays 10 can be installed in the head-mounted instrument HMDa, and one of the liquid-crystal displays 10 can display a right-eye image, and the other liquid-crystal display 10 can display a left-eye image.

As illustrated in FIG. 2, the lens 80 is interposed between the liquid-crystal display 10 and the user's eyeball EY, and refracts transmitted light. Regulating the focal distance of the lens 80 allows the user to recognize an image formed on a retina (i.e., eye) EYb of the eyeball EY via a crystalline lens EYa of the eyeball EY, in such a manner that this image is displayed on a virtual display VD apparently disposed in a location away from the eyeball EY by a distance L2 that is much distant than the actual distance, i.e., a distance L1 from the eyeball EY to the liquid-crystal display 10. Consequently, the user can visually recognize an enlarged image (i.e., virtual image) displayed on the virtual display VD having a screen size much greater (e.g., about from several tens of inches to several hundreds of inches) than the screen size of the liquid-crystal display 10 (e.g., about from zero point several inches to several inches).

Figure 3:
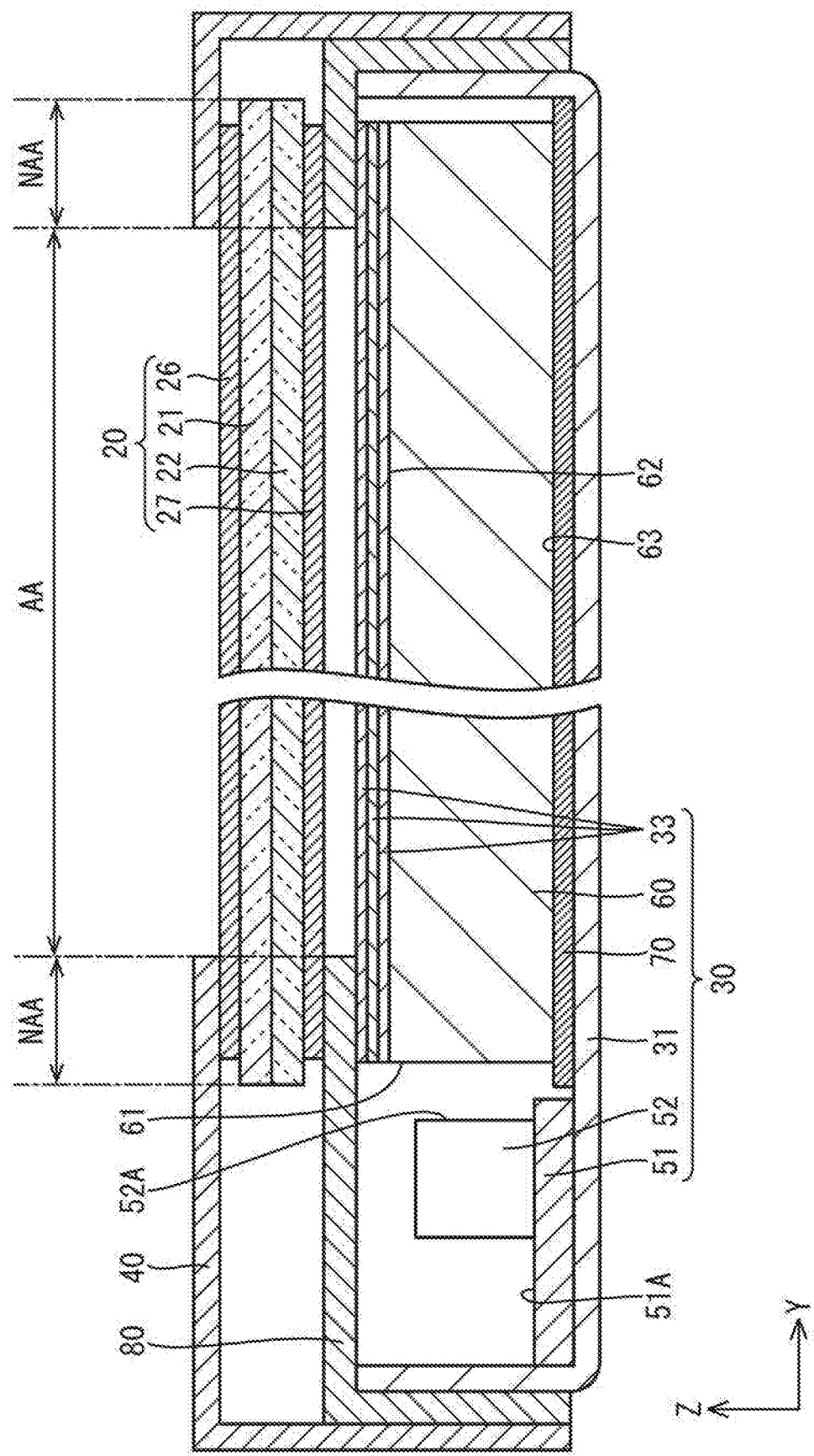
FIG. 3 is a cross-sectional view of the liquid-crystal display according to the first preferred embodiment.

As illustrated in FIGS. 2 and 3, the liquid-crystal display 10 includes the liquid-crystal panel 20 (which is an example of a display panel) that displays an image, and the backlight 30 (which is an example of an illumination device) that is disposed at the back of the liquid-crystal panel 20, and casts light upon the liquid-crystal panel 20. As illustrated in FIG. 3, the liquid-crystal panel 20 has a liquid-crystal layer between a pair of substrates 21 and 22. The liquid-crystal layer contains liquid-crystal molecules whose optical properties change upon electric-field application. Disposed on one of the substrates, which is the substrate (i.e., array substrate) 21, are components, such as switching elements (e.g., TFTs) connected to source and gate lines orthogonal to each other, pixel electrodes connected to the switching elements, and an alignment film. Disposed on the other substrate, which is the substrate (i.e., CF substrate) 22, are components, such as a color filter with, for instance, red (R), green (G), and blue (B) portions arranged in a predetermined manner, and an alignment film. Attached outside the substrates 21 and 22 is a pair of polarizer plates 26 and 27. The liquid-crystal panel 20 is rectangular in plan view, and its plane is sectioned into a display region (i.e., active area) AA and a non-display region (i.e., non-active area) NAA. The display region AA is a region where an image can be displayed, and is in the middle of the liquid-crystal panel 20. The non-display region is in the form of a frame in plan view surrounding the display region AA.

As illustrated in FIG. 3, the backlight 30 includes a chassis 31 having a substantial box-shape that is open toward the front. The chassis 31 houses LEDs 52 (which are light sources), an LED substrate 51 for mounting the LEDs 52, a light guide plate 60 where light from the LEDs 52 is incident, an optical sheet 33 that adds a predetermined optical action to the light emitted from the light guide plate 60, and a reflective sheet 70 that reflects exited light toward the light guide plate 60. The backlight 30 is an edge-light (or side-lit) backlight. In this edge-light backlight, the LEDs 52 are disposed on a side on the back of the liquid-crystal panel 20, and the light guide plate 60 guides the light from the LEDs 52 toward the liquid-crystal panel 20 in a planar manner. The following details the individual components of the backlight 30.

As illustrated in FIG. 3, the LED substrate 51 is adjacent to a light-entrance surface 61 of the light guide plate 60, and has a surface (i.e., mount surface) 51A where the LEDs 52 are mounted. Each LED 52 is a white LED that emits white light, and is configured such that a blue LED chip that emits blue light alone (which is called a blue-light emitting element) is sealed using a sealant with fluorescent materials (such as a green fluorescent material and a red fluorescent material) distributed. The LEDs 52 are electrically connected via a pattern of wire disposed in the mount surface 51A and consisting of a metal film. The LEDs 52 emit light upon application of a forward voltage (or upon supplement of a drive current). Each LED 52 is a side-surface (or side-view) LED whose button surface is on the mount surface 51A, and whose side surface serves as a light-emitting surface 52A.

The light guide plate 60 is made of almost-transparent synthetic resin having a refractive index sufficiently higher than that of air, as illustrated in FIG. 3. Examples of this resin include an acrylic resin (e.g., PMMA) and a polycarbonate. The light guide plate 60 has a flat shape (i.e., rectangular shape) as is the case with the liquid-crystal panel 20, and is a plate thicker than the optical sheet 33 as illustrated in FIG. 3. The light guide plate 60 receives, from the light-entrance surface 61, the light emitted from the LEDs 52, and orients the light toward the optical sheet 33 while propagating the light therethrough, to let the light go out of its front surface (i.e., light-exit surface) 62. The light guide plate 60 has a back surface 63. The back surface 63 has a light-reflecting portion. The light from the light-entrance surface 61 of the light guide plate 60 reflects on the light-reflecting portion to move toward the light-exit surface 62, while propagating in the +Y-axis direction (i.e., from the left to right in FIG. 3), thus going out of the light-exit surface 62.

The optical sheet 33 is a stack of a wavelength-selection sheet, prism sheet, reflective polarizer plate, and other things, and has a flat shape (i.e., rectangular shape) as is the case with the liquid-crystal panel 20. The optical sheet 33, which is between the liquid-crystal panel 20 and the light guide plate 60, adds a predetermined optical action to the light emitted from the light guide plate 60 and then let the light go out toward the liquid-crystal panel 20.

The reflective sheet 70 is a rectangular sheet made of synthetic resin, and its surface is white for instance, which has high reflectivity of light. The reflective sheet 70 is between the back surface 63 of the light guide plate 60 and the bottom plate of the chassis 31. The reflective sheet 70 reflects the light exiting from the LEDs 52 or the back surface 63 of the light guide plate 60, toward the light guide plate 60.

Figure 4:
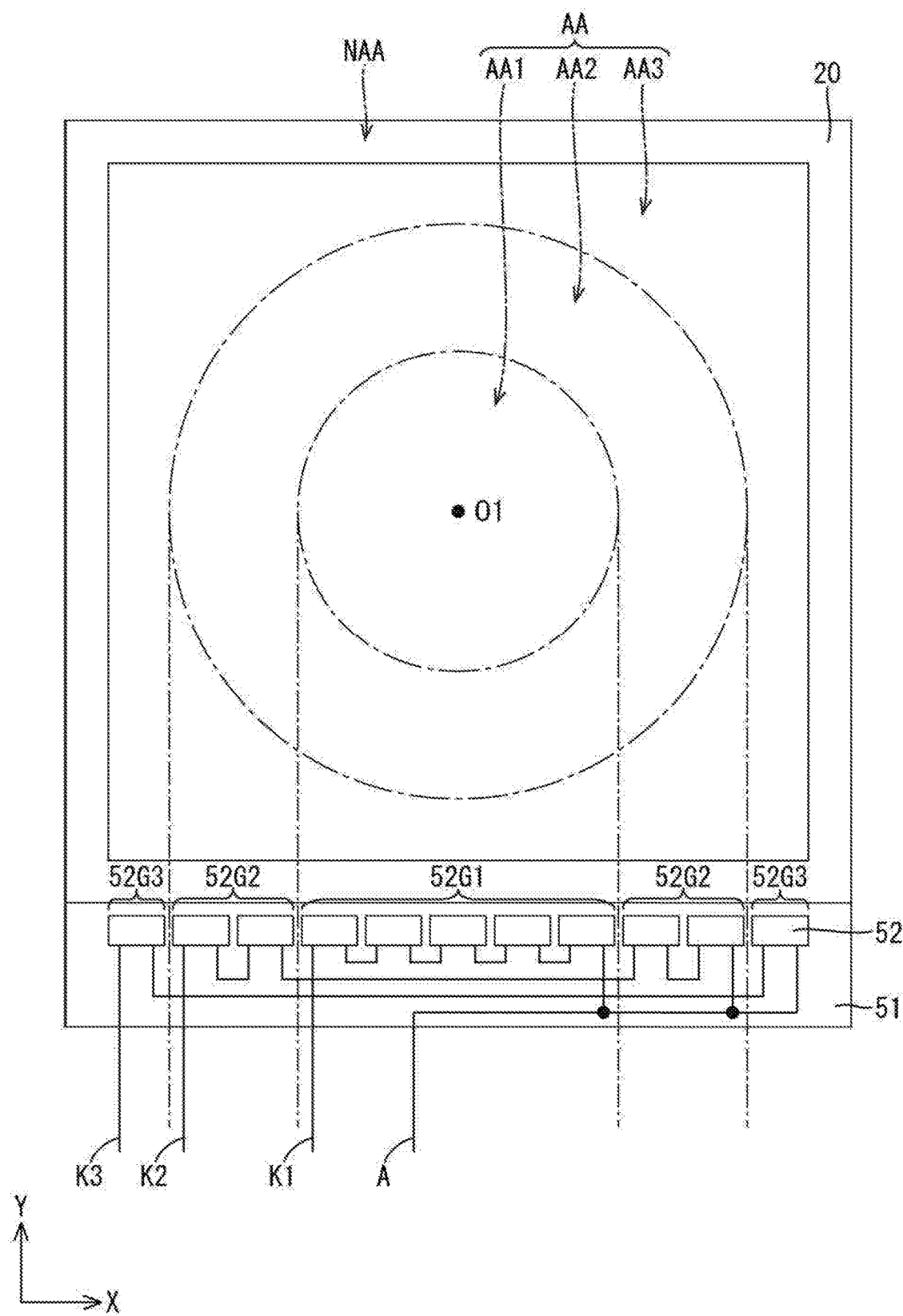
FIG. 4 is a plan view of the positional relationship between sections of a liquid-crystal panel and LEDs in the first preferred embodiment.

With reference to FIG. 4, the following describes the positional relationship between the liquid-crystal panel 20 and the LEDs 52. As illustrated in FIG. 4, the display region AA of the liquid-crystal panel 20 is sectioned into multiple sections (there are three sections in FIG. 4: AA1, AA2, and AA3) disposed concentrically about a center point O1 of the display region AA. The individual radiuses of these concentric circles are set as appropriate in accordance with specifications and other things. The concentric circles herein include substantially concentric circles. In this preferred embodiments, each of the sections AA1, AA2, and AA3 is provided with a reference of allowance (or reference of quality) in which an allowable number of defects, an allowable number of foreign substances, and other things are specified, and the reference of quality becomes more strict with increasing proximity from the outer edge toward middle of the concentric circles, that is, the section AA3 has the least strict reference of quality, followed by the section AA2, followed by the section AA1. In other words, the sections AA1, AA2, and AA3 have mutually different references of quality inspection, whereas the sections AA1, AA2, and AA3 are common in the configuration of the liquid-crystal panel 20 and the method of producing the liquid-crystal panel 20. This is because human eyes recognize an image at high resolution at the center of view (i.e., viewpoint), but the image gradually gets more blurred with distance from the center of view toward the outside, thus causing the human eyes to recognize the image at low resolution. The section AA3 adjacent to the outer edge of the concentric circles, which tends to be the periphery of view, has a less strict reference of quality. On the other hand, the reference of quality gets more strict with increasing proximity from the outer edge toward middle of the concentric circles, that is, the section AA3 has the least strict reference of quality, followed by the section AA2, followed by the section AA1, because such a section closer to the middle of the concentric circles than the other sections tends to be the center of view.

As illustrated in FIG. 4, the LEDs 52 (there are 11 LEDs in FIG. 4) are arranged in a line to face the light-entrance surface 61 of the light guide plate 60. The LEDs 52 are separated into three groups: 52G1, 52G2, and 52G3, according to their placement. The group 52G1 consists of five LEDs 52 disposed in the middle in the direction of their arrangement. The group 52G2 consists of four LEDs 52 in total: two of them are on the right of the group 52G1, and the remaining two are on the left of the same. The group 52G3 consists of two LEDs 52 in total: one of them are on the right of the group 52G2, and the other is on the left of the same. The groups 52G1, 52G2, and 52G3 are grouped so as to emit light to the sections AA1, AA2, and AA3 of the liquid-crystal panel 20, respectively. The light from the LEDs 52 in the group 52G1 is oriented toward the liquid-crystal panel 20 while propagating through the light guide plate 60 in the +Y-axis direction, and then passes through the optical sheet 33 to radiate out, mainly into the section AA1 Likewise, the light from the LEDs 52 in the group 52G2 radiates out mainly into the section AA2; and the light from the LEDs 52 in the group 52G3, mainly into the section AA3. The LEDs 52 are thus grouped in such a manner the LEDs 52 that emit light mainly to the section AA1 fall under the group 52G1, the LEDs 52 that emit light mainly to the section AA2 fall under the group 52G2, and the LEDs 52 that emit light mainly to the section AA3 fall under the group 52G3.

Figure 5:
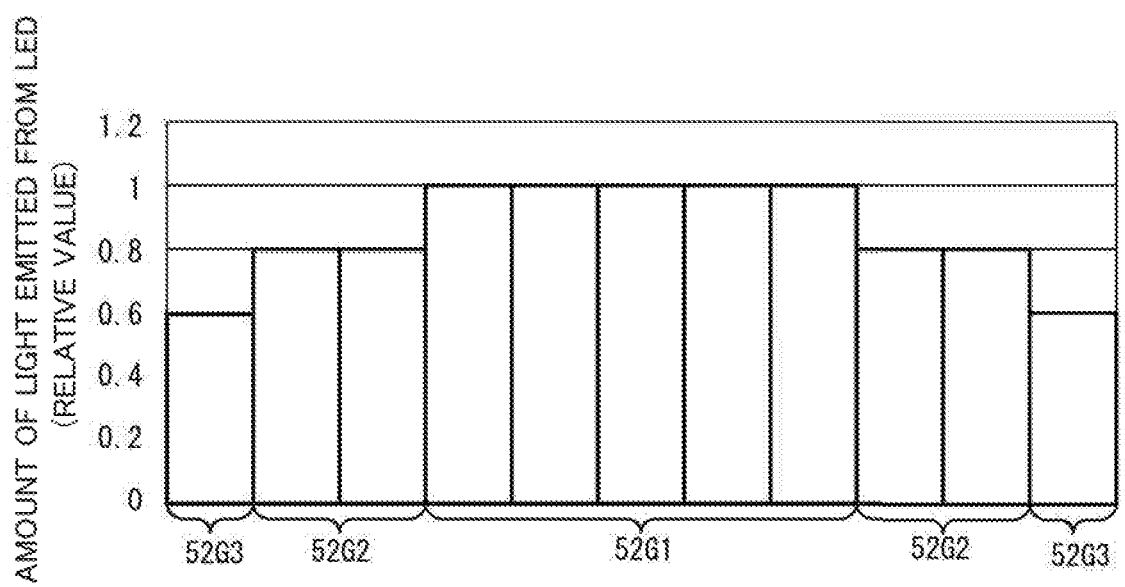
FIG. 5 is a graph showing the amount of light emitted from the LEDs in FIG. 4.

The LEDs 52 are controlled by a regulator 17 (which will be described later on) in such a manner that the groups 52G1, 52G2, and 52G3 emit mutually different amounts of light. As illustrated in FIG. 5 for instance, the regulator 17 regulates the amount of light from the LEDs 52 in such a manner that the five LEDs 52 in the group 52G1 emit a relatively large amount of light, that the two LEDs 52 in the group 52G3 emit a relatively small amount of light, and that the four LEDs 52 in the intervening group 52G2, which emits light to the section AA2, emit an intermediate amount of light. Such regulation enables the section AA1 to have relatively high brightness, enables the section AA3 to have relatively low brightness, and enables the section AA2 to have intermediate brightness. Here, the vertical axis in FIG. 5 indicates the amount of light emitted from each LED 52. This amount is relative to the amount of light emitted from the LEDs 52 of the group 52G1, which is expressed as "1". In the section AA1, which tends to be the center of view, brightness is enhanced to increase display quality. The sections AA2 and AA3 in contrast tend to be away from the center of view with distance from the middle toward outer edge of the concentric circles; hence, the user is less likely to recognize that the image in these sections with reduced brightness is being displayed at low brightness. Reducing the amount of light emitted from the LEDs 52 in the groups 52G2 and 52G3 can prevent degradation in display quality to such a degree that the degradation is not visually recognizable, and at the same time, can reduce the power consumption of the LEDs 52.

Figure 6:
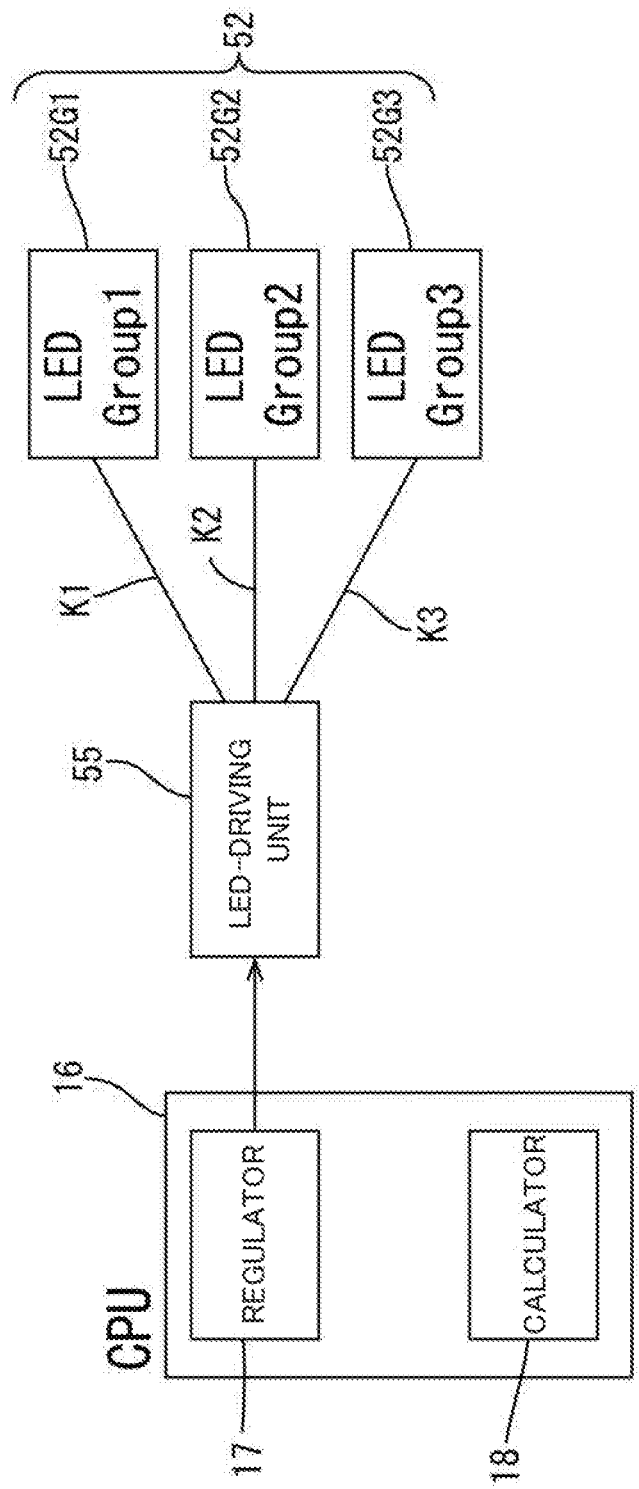
FIG. 6 is a block diagram relating to the control of the liquid-crystal display over the LEDs in the first preferred embodiment.

As illustrated in FIG. 4, the LEDs 52 are connected in series for each of the groups 52G1, 52G2, and 52G3. The LEDs 52 in the group 52G1, the LEDs 52 in the group 52G2, and the LEDs 52 in the group 52G3 are respectively connected to a cathode wire K1, a cathode wire K2, and a cathode wire K3. Supplying a current (or a forward voltage) from an LED-driving unit 55 (which is an example of a light-source driving unit) to an anode wire A and each of the cathode wires K1, K2, and K3 drives the LEDs 52, and the LEDs 52 thus emit light. As illustrated in FIG. 6, the liquid-crystal display 10 includes a control substrate 16 (e.g., a CPU) that includes the regulator 17. The regulator 17 regulates the value of the current supplied from the LED-driving unit 55. The regulator 17 regulates the amount of light emitted from the LEDs 52 for each of the groups 52G1, 52G2, and 52G3 by regulating the current value for each of the groups 52G1, 52G2, and 52G3. In this way, the liquid-crystal display 10 regulates the amount of light emitted from the LEDs 52, by extension, the brightness of the liquid-crystal device 10 in such a manner that the sections AA1, AA2, and AA3 have their brightness levels different from each other.

As described above, the liquid-crystal display 10 according to this preferred embodiment includes the liquid-crystal panel 20 having the display region AA for image display. The liquid-crystal display 10 also includes the backlight 30 that has the multiple LEDs 52 and casts light upon the liquid-crystal panel 20. The liquid-crystal display 10 also includes the control substrate 16 having the regulator 17 that regulates the amount of light emitted from the LEDs 52. The display region AA is sectioned into multiple sections: AA1, AA2, and AA3 provided in the form of concentric circles. The regulator 17 regulates the amount of light in such a manner that the section AA1 adjacent to the middle of the concentric circles is irradiated with a relatively large amount of light, and that the section AA3 adjacent to the outer edge of the concentric circles is irradiated with a relatively small amount of light.

Human eyes recognize an image at high resolution at the center of view (i.e., viewpoint), but the image gradually gets more blurred with distance from the center of view toward the outside, thus causing the human eyes to recognize the image at low resolution. Accordingly, the configuration in which the LEDs 52 emit a large amount of light in the section AA1, where the image recognized at high resolution, and emit a small amount of light in the section AA3, where the image is recognized at low resolution, enables brightness and display quality to enhance in the section AA1, and enables the LEDs 52 to consume less power in the section AA3. Although the section AA3 has low brightness, the user is less likely to recognize that the image is displaying at low brightness, because of the characteristics of human eyes. Hence, the above configuration can prevent degradation in display quality to such a degree that the degradation is not visually recognizable, and at the same time, can reduce power consumption.

The regulator 17 decreases the amount of light stepwise from the section AA1, adjacent to the middle of the concentric circles, toward the section AA3, adjacent to the outer edge of the concentric circles. Doing so can regulate the amount of light to bring it into condition closer to the aforementioned eye characteristics.

The LEDs 52 are separated into groups in such a manner that the groups correspond to the respective sections AA1, AA2, and AA3 of the liquid-crystal panel 20. In addition, the regulator 17 regulates the amount of light for each of the groups 52G1, 52G2, and 52G3. Doing so facilitates the regulation of the amount of light from the LEDs 52 in such a manner that the sections AA1, AA2, and AA3 are irradiated with mutually different amounts of light.

The regulator 17 regulates the amount of light by controlling the LED-driving unit 55 that supplies a current to the LEDs 52 to drive the LEDs 52. Doing so facilitates the regulation of the amount of light using a current value. In addition, regulating the current value for each of the groups 52G1, 52G2, and 52G3 achieves suitable regulation such that the sections AA1, AA2, and AA3 are irradiated with mutually different amounts of light.

The center of the display region AA coincides with the center of the concentric circles. The center of the display region AA tends to be the center of image display, by extension, the center of a viewpoint. Sectioning the sections AA1, AA2, and AA3 concentrically from a location that tends to be the center of the viewpoint provides a configuration that conforms with the eye characteristics.

Second Preferred Embodiment

Figure 7:
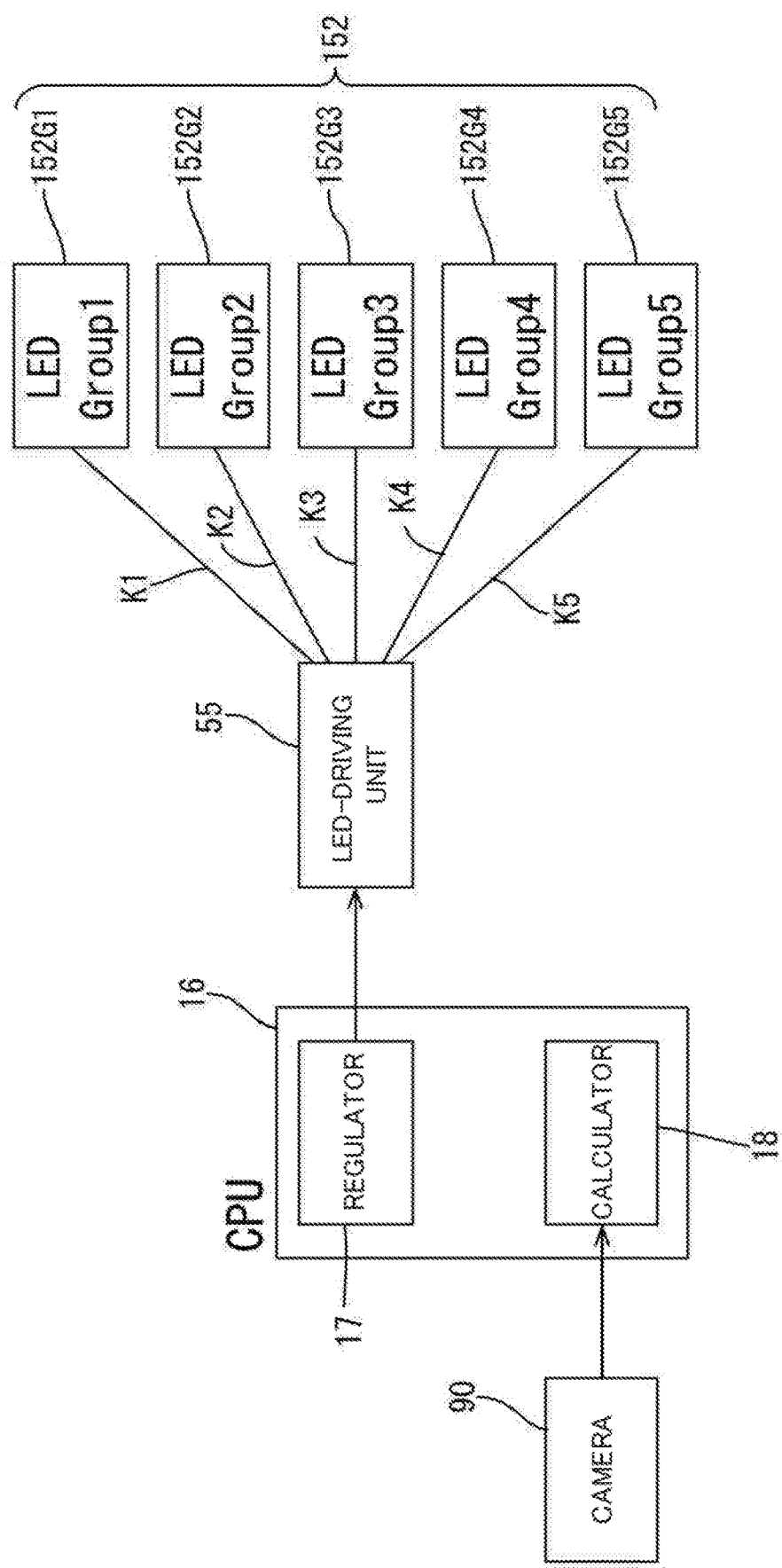
FIG. 7 is a block diagram relating to the control of a liquid-crystal display over LEDs in a second preferred embodiment.

A second preferred embodiment of the present invention will be described with reference to FIGS. 7 to 9. A liquid-crystal display 110 according to the second preferred embodiment regulates the amount of light emitted from LEDs 152 by using information about a user's viewpoint detected by an external camera 90 (which is an example of a detector). Components, actions, and effects in the second preferred embodiment that are similar to those in the first preferred embodiment will not be elaborated upon.

In this preferred embodiment, the head-mounted instrument HMDa has the camera 90, and the head-mounted display HMD has the function of eye-tracking. As illustrated in FIG. 7, the camera 90 provides a user's detected viewpoint to a calculator 18 included in the control substrate 16 (such as a CPU). Based on the viewpoint information, the calculator 18 calculates the amount of light emitted from the LEDs 152 for each section, and based on the result calculated by the calculator 18, the regulator 17 regulates the amount of light emitted from the LEDs 152 for each section.

This configuration enables the liquid-crystal display 110 to display an image based on the eye characteristics while reflecting the movement of the viewpoint.

Figure 8:
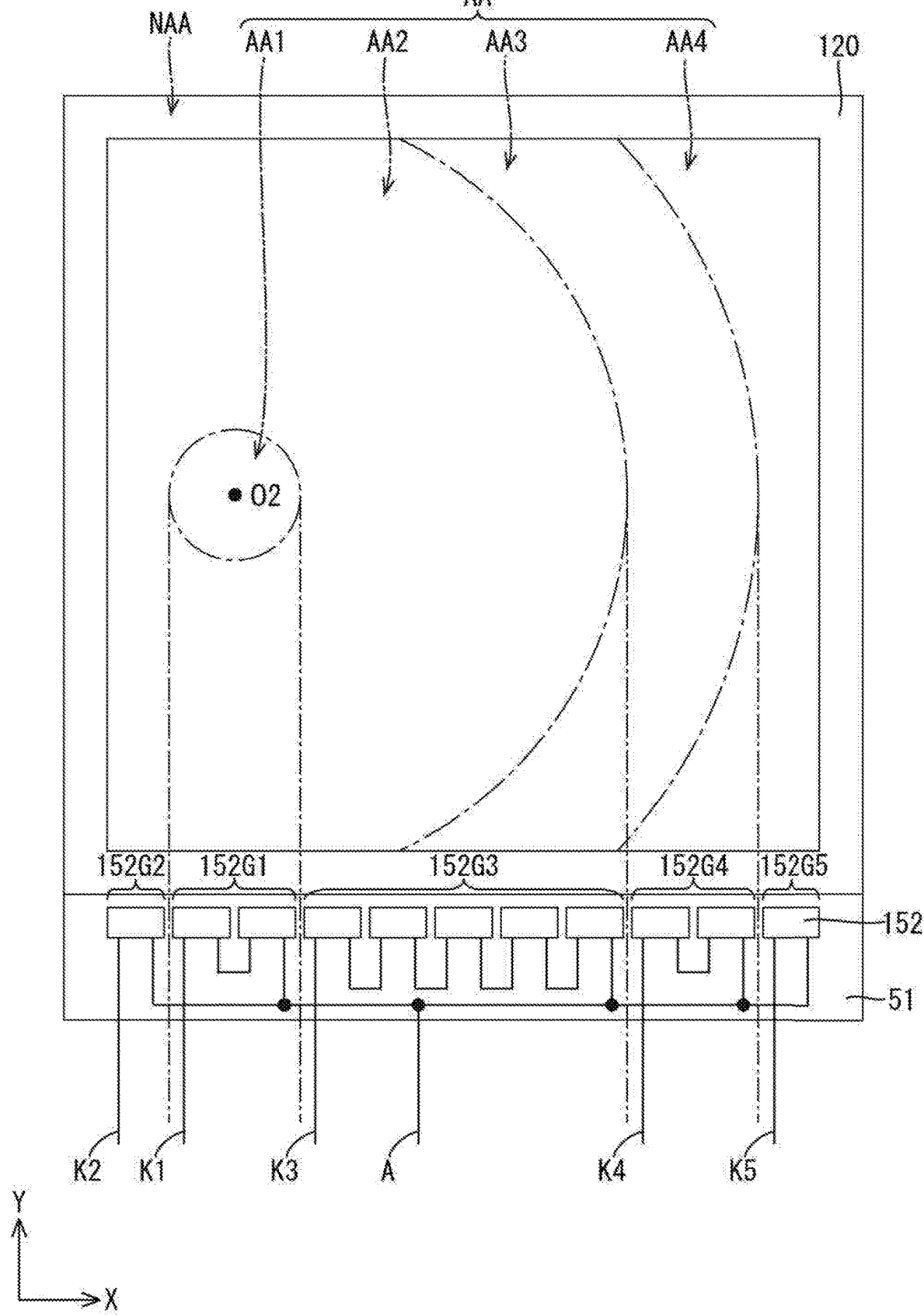
FIG. 8 is a plan view of the positional relationship between sections of a liquid-crystal panel and the LEDs in the second preferred embodiment.

As illustrated in FIG. 8, a liquid-crystal panel 120 in this preferred embodiment is sectioned into four sections: AA1, AA2, AA3, and AA4 disposed concentrically about a viewpoint, that is, a center point O2. Since the center point O2 of the concentric circles shifts along with the viewpoint, the boundaries between the sections AA1, AA2, AA3, and AA4 shift according to the movement of the viewpoint. Moreover, the LEDs 152 are separated into five groups: 152G1, 152G2, 152G3, 152G4, and 152G5, according to their placement. To be specific, FIG. 8 shows that the LEDs 152 that emit light mainly to the section AA1 fall under the group 152G1, a single LED 152 on the left of the group 152G1, among the LEDs 152 that emit light mainly to the section AA2, falls under the group 152G2, and the remaining five LEDs 152 on the right of the group 152G1 fall under the group 152G3. In addition, the LEDs 152 that emit light mainly to the section AA3 fall under the group 152G4, and the LED 152 that emits light mainly to the section AA4 falls under the group 152G5. Unlike the corresponding one in the first preferred embodiment, the center point O2 of the concentric circles does not necessarily coincide with the center of the display region AA. The number of sections (there are herein four sections) and the number of groups of the LEDs 152 (there are herein five groups) hence do not necessarily coincide with each other.

Figure 9:
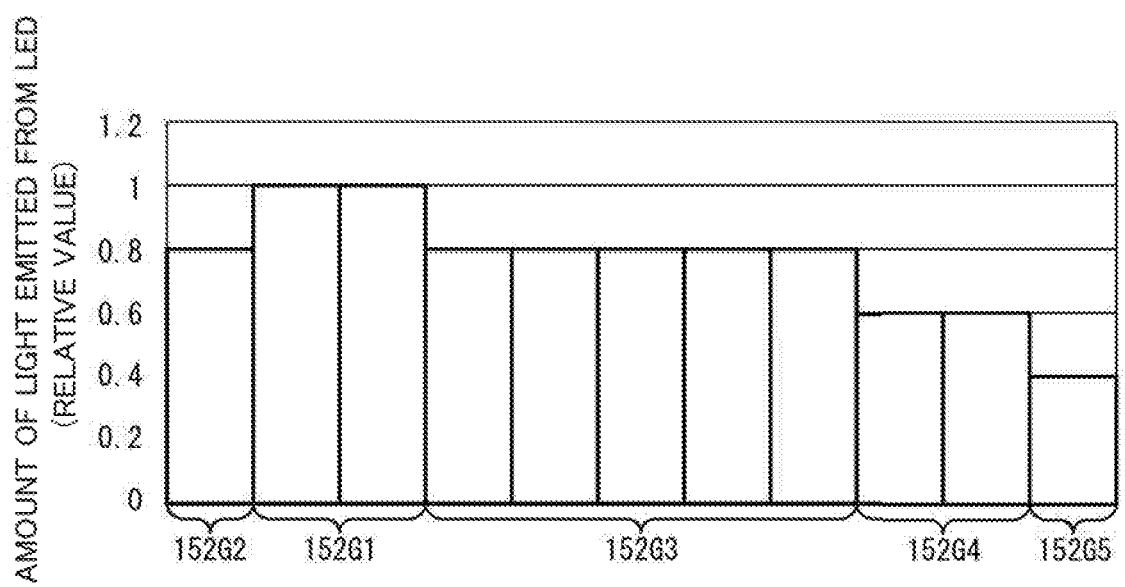
FIG. 9 is a graph showing the amount of light emitted from the LEDs in FIG. 8.

As illustrated in FIG. 9, the amount of light from the LEDs 152 is regulated in such a manner that the group 152G1 emits a relatively large amount of light, and that the amount of light from the LEDs 152 in the groups 152G2, 152G3, 152G4, and 152G5 decreases stepwise. The amount of light consequently decreases stepwise from the section AA1 adjacent to the middle of the concentric circles toward the section AA4 adjacent to the outer edge of the concentric circles. Such a configuration enables brightness and display quality to enhance in the section AA1, which tends to be the center of view, and enables the LEDs 152 to consume less power in the sections AA2, AA3, and AA4. Since the section gets more remote from the center of view along with increasing proximity from the middle toward outer edge of the concentric circles, that is, starting from the section AA1, followed by the section AA2, followed by the section AA3, followed by the section AA4, the user is less likely to recognize that the image is displaying at low brightness, because of the characteristics of human eyes. Hence, the above configuration can prevent degradation in display quality to such a degree that the degradation is not visually recognizable, and at the same time, can reduce power consumption.

Third Preferred Embodiment

A third preferred embodiment of the present invention will be described with reference to FIGS. 10 and 11. The third preferred embodiment describes the backlight 30 according to the first preferred embodiment modified to function as a direct-lit backlight. Components, actions, and effects in the third preferred embodiment that are similar to those in the first and second preferred embodiments will not be elaborated upon.

Figure 10:
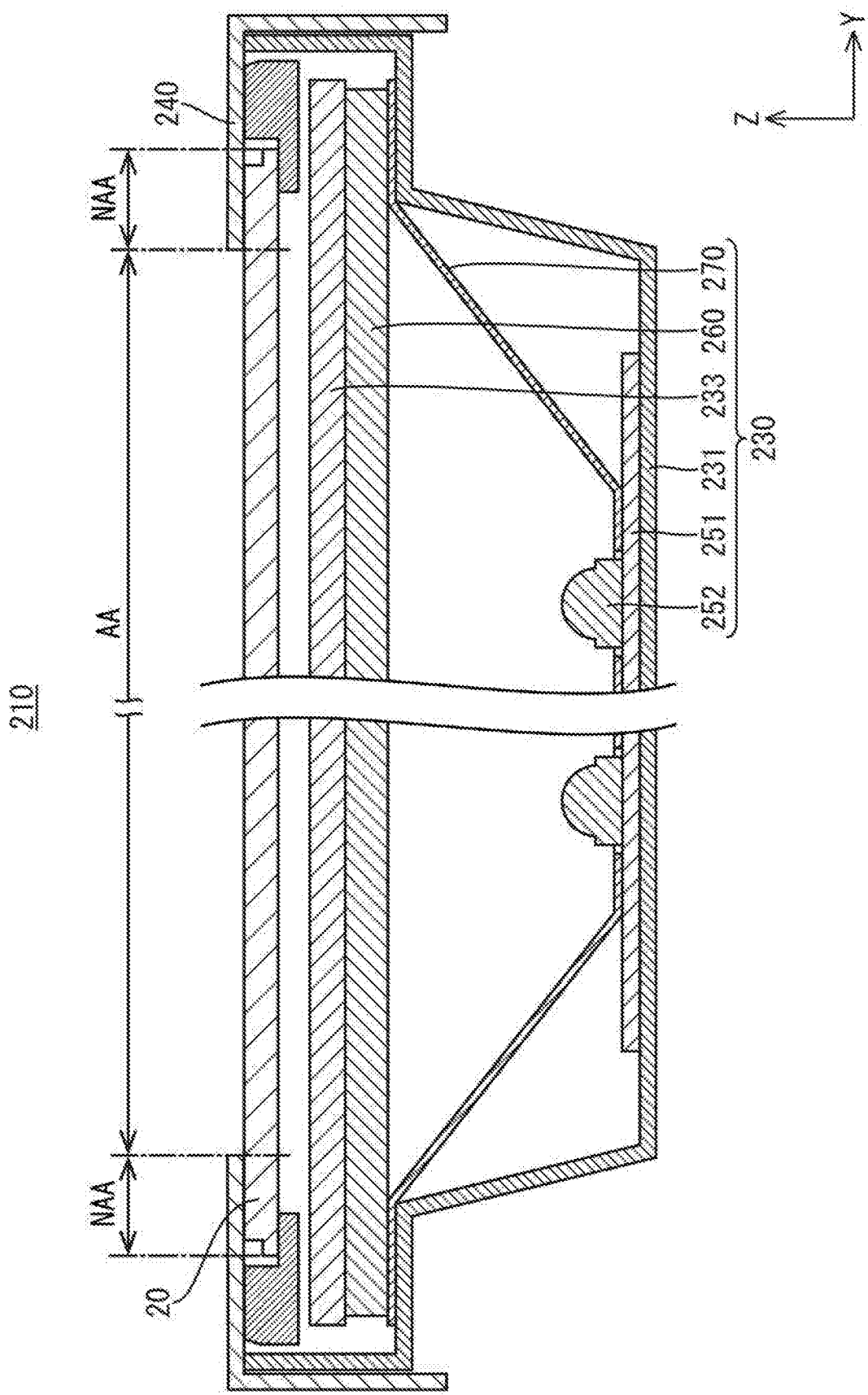
FIG. 10 is a cross-sectional view of a liquid-crystal display according to a third preferred embodiment.

As illustrated in FIG. 10, a liquid-crystal display 210 is configured such that the liquid-crystal panel 20 and a direct-lit backlight 230 are integrated together by a bezel 240, chassis 231, and other components. The backlight 230 includes the chassis 231 having a substantial box-shape that is open toward the front, a diffusion plate 260 disposed over the opening of the chassis 231, and an optical sheet 233 that adds a predetermined optical action to light emitted from the diffusion plate 260. The chassis 231 houses LEDs 252 disposed directly under the diffusion plate 260 to face each other, an LED substrate 251 on which the LEDs 252 are mounted, and a reflective sheet 270 that reflects light within the chassis 231 toward the diffusion plate 260. The backlight 230 is a "direct-lit" backlight in which the LEDs 252 are disposed directly under the liquid-crystal panel 20 to face each other.

The LED substrate 251 is rectangular and housed along the bottom of the chassis 231. The LED substrate 251 has a front surface (i.e., mount surface) on which, as illustrated in FIG. 11, the multiple LEDs 252 are arranged in parallel in the X-axis and Y-axis directions (i.e., in rows and columns) at almost regular intervals to constitute a lattice. The LEDs 252 are top-emitting (or top-view) LEDs each having a bottom surface disposed on the mount surface, and each having a top surface serving as a light-emitting surface.

The reflective sheet 270 has a surface of white, which has high reflectivity of light, and is large enough to cover almost the entire inner surface of the chassis 231. The reflective sheet 270 is shaped like a bowl overall, and reflects the light exiting from the LEDs 252 and the back surface of the diffusion plate 260, toward the diffusion plate 260.

As illustrated in FIG. 9, the diffusion plate 260 is thicker than the optical sheet 233, and has a perimeter superposed on a receiving part of the chassis 231 with the reflective sheet 270 interposed therebetween. The light emitted in the Z-axis direction from the LEDs 252 enters the back surface (i.e., light-entrance surface) of the diffusion plate 260, and goes out of the front surface (i.e., light-exit surface) of the diffusion plate 260 to diffuse toward the optical sheet 233.

Figure 11:
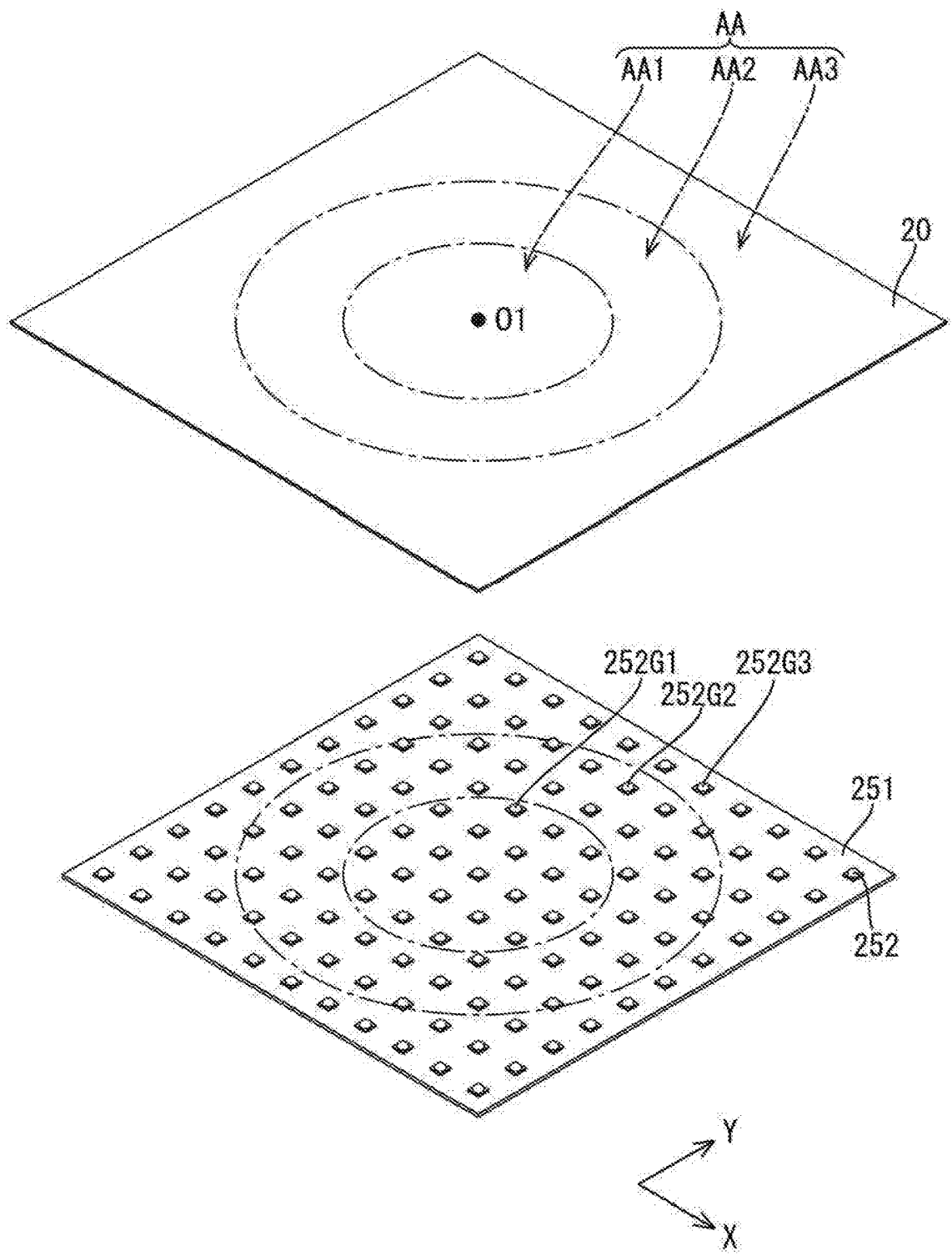
FIG. 11 is a perspective view of the positional relationship between sections of a liquid-crystal panel and LEDs in the third preferred embodiment.

With reference to FIG. 11, the following describes the positional relationship between the liquid-crystal panel 20 and the LEDs 252. FIG. 11 illustrates the display region AA of the liquid-crystal panel 20 in perspective view, and the LED substrate 251 in perspective view with the LEDs 252 mounted thereon, in order to clearly indicate their positional relationship Like the corresponding one in the first preferred embodiment, the display region AA in this preferred embodiment is sectioned into multiple sections (there are three sections in FIG. 11: AA1, AA2, and AA3) disposed concentrically about the center point O1 of the display region AA. Moreover, the LEDs 252 are separated into three groups: 252G1, 252G2, and 252G3, according to their placement. To be specific, FIG. 11 illustrates that the LEDs 252 that emit light mainly to the section AA1, that is, the LEDs 252 facing the section AA1, fall under the group 252G1. Likewise, FIG. 11 illustrates that the LEDs 252 that emit light mainly to the section AA2, that is, the LEDs 252 facing the section AA2, fall under the group 252G2. FIG. 11 also illustrates that the LEDs 252 that emit light mainly to the section AA3, that is, the LEDs 252 facing the section AA3, fall under the group 253G3. The LEDs 252 in each group are connected in series via a pattern of wire disposed in a mount surface.

The regulator 17 regulates the amount of light emitted from the LEDs 252 for each of the groups 252G1, 252G2, and 252G3 by regulating, for each of the groups 252G1, 252G2, and 252G3, the value of a current supplied from the LED-driving unit 55. The regulator 17 regulates the amount of light in such a manner that the LEDs 252 in the group 252G1 emit a relatively large amount of light, that the LEDs 252 in the group 252G3 emit a relatively small amount of light, and that the LEDs 252 in the group 252G2 emit an intermediate amount of light. Such regulation enables the section AA1 to have relatively high brightness, the section AA3 to have relatively low brightness, and the section AA2 to have intermediate brightness. Consequently, the section AA1, which tends to be the center of view, has high brightness and thus has high display quality. The sections AA2 and AA3 in contrast tend to be away from the center of view with distance from the middle toward outer edge of the concentric circles; hence, a user is less likely to recognize that the image in these sections with reduced brightness is being displayed at low brightness. Reducing the amount of light emitted from the LEDs 252 in the groups 252G2 and 252G3 can prevent degradation in display quality to such a degree that the degradation is not visually recognizable, and at the same time, can reduce the power consumption of the LEDs 252.

Other Preferred Embodiments

The present invention is not limited to the foregoing preferred embodiments described along with the descriptions and drawings. The technical scope of the present invention encompasses the following exemplary preferred embodiments as well.

(1) Each of the foregoing preferred embodiments has described an example of the number of sections and an example of the number of LED groups. Multiple sections and multiple LED groups need to be provided.

(2) The backlight, although being, by ways of example only, an edge-lit backlight in which light comes from one side in the first and second preferred embodiments, may be an edge-lit backlight in which light comes from both sides.

(3) Although the foregoing preferred embodiments have described an instance where there is one LED-driving unit, there may be multiple LED-driving units each provided for a corresponding LED group. In this case, the regulator controls each LED-driving unit.

(4) The LEDs, although being side-view LEDs in the first and second preferred embodiments, may be top-view LEDs. Moreover, instead of white LEDs, single-colored LED chips of multiple different colors (e.g., blue, green, and red) may be arranged in combination to achieve pseudo-white.

(5) The LEDs, although arranged in the form of a lattice in the third preferred embodiment, may be arranged concentrically or in other manners.

(6) The third preferred embodiment has described an instance where the center of the concentric circles, which serve as the boundaries of the sections, coincides with the center of the display region. In some preferred embodiments, viewpoint information can be reflected as is the case with the second preferred embodiment, and the viewpoint can coincide with the concentric circles.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:
a display panel comprising a display region for image display, the display region having a rectangular shape;
an illumination device comprising a plurality of light sources arranged in a line, the illumination device being configured to cast, upon the display panel, light emitted in parallel from the plurality of light sources; and
a control substrate comprising a regulator configured to regulate an amount of light emitted from the plurality of light sources,
wherein the display region is sectioned into a plurality of sections in a form of concentric circles, the plurality of sections including a section adjacent to a middle of the concentric circles and having a circular shape, and a section adjacent to an outer edge of the concentric circles and having a rectangular shape,
the plurality of light sources are separated into groups in such a manner that the groups correspond to the plurality of respective sections, and
the regulator regulates the amount of light in such a manner that the amount of light in one of the groups corresponding to the section adjacent to the middle is relatively large, and in such a manner that the amount of light in another one of the groups corresponding to the section adjacent to the outer edge is relatively small.

2. The display device according to claim 1, wherein the regulator decreases the amount of light stepwise from the section adjacent to the middle of the concentric circles toward the section adjacent to the outer edge of the concentric circles.

3. The display device according to claim 1, wherein
the plurality of light sources comprise LEDs, and
the LEDs are connected in series for each of the groups.

4. The display device according to claim 1, wherein the regulator regulates the amount of light by controlling a light-source driving unit configured to supply a current to the plurality of light sources to drive the plurality of light sources.

5. The display device according to claim 1, wherein the concentric circles have a center that coincides with a center of the display region, the concentric circles serving as boundaries of the plurality of sections.

6. The display device according to claim 5, wherein each of the plurality of sections is provided with a reference of allowance with regard to a number of defects and a number of foreign substances.

7. The display device according to claim 1, wherein
the control substrate comprises a calculator configured to calculate the amount of light for each of the plurality of sections in accordance with information about a viewpoint, the information being supplied from a detector disposed outside, and
the regulator regulates the amount of light in accordance with a result calculated by the calculator.

8. The display device according to claim 7, wherein the concentric circles have a center that coincides with the viewpoint, the concentric circles serving as boundaries of the plurality of sections.

9. The display device according to claim 7, wherein
the regulator regulates the amount of light by controlling a light-source driving unit configured to supply a current to the plurality of light sources to drive the plurality of light sources, and
the calculator calculates a value of the current, supplied from the light-source driving unit to the plurality of light sources.

10. A head-mounted display comprising
a head-mounted instrument to be mounted onto a head of a user,
wherein the head-mounted instrument comprises:
the display device according to claim 7;
a lens configured to form an image displayed on the display device onto eyes of the user; and
the detector.

11. The head-mounted display according to claim 10, wherein the detector comprises a camera.

12. The display device according to claim 1, wherein the illumination device comprises a light guide plate configured to guide the light emitted from the plurality of light sources, and the plurality of light sources are arranged in parallel in a predetermined direction so as to face a light-entrance surface of the light guide plate.

13. The display device according to claim 1, wherein the illumination device comprises a diffusion plate configured to diffuse the light emitted from the plurality of light sources, and the plurality of light sources are arranged in parallel in a planar manner so as to face one of a pair of surfaces of the diffusion plate, the surface being remote from the display panel.

14. A head-mounted display comprising a head-mounted instrument to be mounted onto a head of a user, wherein the head-mounted instrument comprises:

the display device according to claim 1; and a lens configured to form an image displayed on the display device onto eyes of the user.

* * * * *